US012501240B2

United States Patent
Tachikawa

(10) Patent No.: US 12,501,240 B2
(45) Date of Patent: Dec. 16, 2025

(54) COMMUNICATION METHOD

(71) Applicant: NEC Solution Innovators, Ltd., Tokyo (JP)

(72) Inventor: Tsuneo Tachikawa, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 18/273,689

(22) PCT Filed: Jan. 21, 2022

(86) PCT No.: PCT/JP2022/002161
§ 371 (c)(1),
(2) Date: Jul. 21, 2023

(87) PCT Pub. No.: WO2022/172726
PCT Pub. Date: Aug. 18, 2022

(65) Prior Publication Data
US 2024/0107278 A1    Mar. 28, 2024

(30) Foreign Application Priority Data
Feb. 15, 2021   (JP) .................................. 2021-022097

(51) Int. Cl.
*H04W 4/12*         (2009.01)
*G06F 9/451*        (2018.01)
(52) U.S. Cl.
CPC .............. *H04W 4/12* (2013.01); *G06F 9/451* (2018.02)
(58) Field of Classification Search
CPC ......... H04W 4/12; G06F 9/451; G06Q 10/10; H04L 51/04; H04N 7/15

USPC ........................................................ 709/206
See application file for complete search history.

(56) References Cited

U.S. PATENT DOCUMENTS

| 7,716,256 | B2* | 5/2010 | Endo ..................... G06F 16/955 |
| | | | 707/805 |
| 2012/0002883 | A1* | 1/2012 | Gotoh ................ H04N 1/00132 |
| | | | 382/217 |
| 2012/0157129 | A1* | 6/2012 | Kuwahara ............... A63F 13/53 |
| | | | 455/457 |

FOREIGN PATENT DOCUMENTS

| CN | 109663345 A | * | 4/2019 | ............ A63F 13/23 |
| JP | 2012-128731 A | | 7/2012 | |
| JP | 2014-520305 A | | 8/2014 | |
| JP | 2019-061594 A | | 4/2019 | |
| JP | 2019-079476 A | | 5/2019 | |

OTHER PUBLICATIONS

International Search Report for PCT Application No. PCT/JP2022/002161, mailed on Apr. 26, 2022.

(Continued)

*Primary Examiner* — Zi Ye
(74) *Attorney, Agent, or Firm* — Sughrue Mion, PLLC

(57) ABSTRACT

A communication apparatus according to the present invention includes: a map display unit configured to output a map image on which another user is associated with a predetermined position so as to display to a target user; a selection accepting unit configured to accept selection of a position by the target user on the map image; and an output unit configured to acquire information sent by the other user associated with the position on the map image selected by the target user, and output to the target user.

15 Claims, 14 Drawing Sheets

(56) References Cited

OTHER PUBLICATIONS

JP Official Communication for JP Application No. 2022-581293, mailed on Aug. 27, 2024 with English Translation.

* cited by examiner

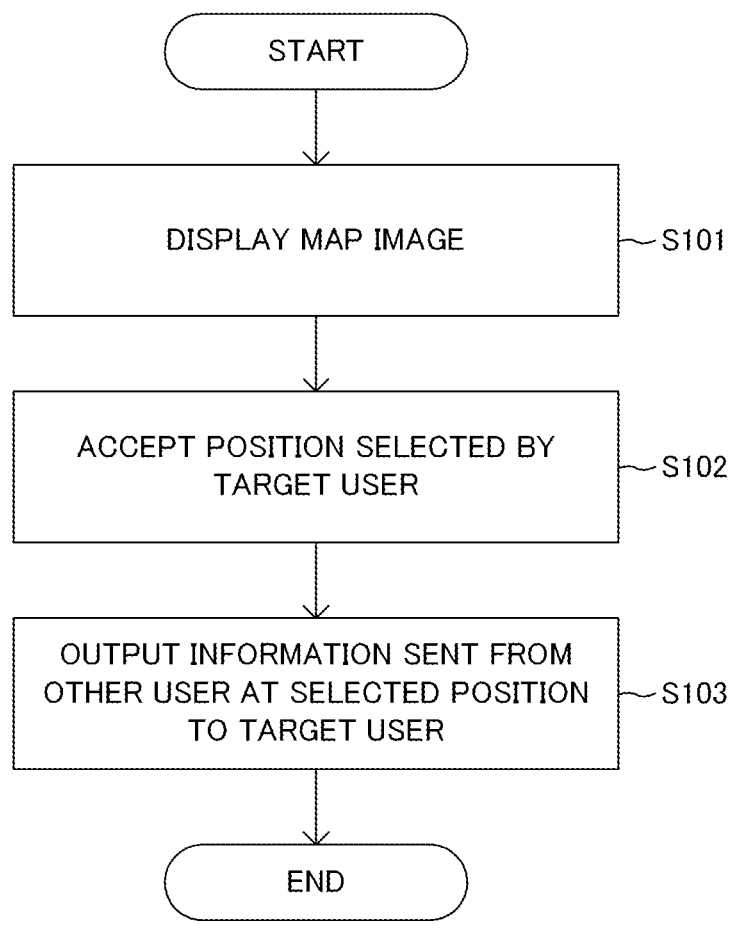

COMMUNICATION METHOD

This application is a National Stage Entry of PCT/JP2022/002161 filed on Jan. 21, 2022, which claims priority from Japanese Patent Application 2021-022097 filed on Feb. 15, 2021, the contents of all of which are incorporated herein by reference, in their entirety.

TECHNICAL FIELD

The present invention relates to a communication method, a communication apparatus, and a program.

BACKGROUND ART

Communicating with others is a daily routine in an organization such as a workplace and in a region. On the other hand, in recent years, with the development of information processing technology and network technology, online communication has become widespread. For example, online communication is performed by methods such as e-mail, online chat, and online meeting as described in Patent Literature 1.

CITATION LIST

Patent Literature

Patent Literature 1: Japanese Unexamined Patent Application Publication No. JP-A2019-061594

SUMMARY OF INVENTION

Technical Problem

However, since the communication methods such as online meeting limit the number of participants and also limit the time for meeting, there is a problem that sufficient communication with others cannot be achieved. In particular, in recent years, due to the spread of telework, opportunities to meet with people in the same organization as well as to incidentally meet with others have decreased, and opportunities for daily conversations and chats have been lost. As a result, there is a problem that it is not possible to casually communicate online in daily life.

Accordingly, an object of the present invention is to provide a communication method that solves the abovementioned problem that it is not possible to casually communicate online.

Solution to Problem

A communication method as an aspect of the present invention includes:
  outputting a map image on which another user is associated with a predetermined position so as to display to a target user;
  accepting selection of a position by the target user on the map image; and
  acquiring information sent by the other user associated with the position on the map image selected by the target user, and outputting to the target user.

Further, a communication apparatus as an aspect of the present invention includes:
  a map display unit configured to output a map image on which another user is associated with a predetermined position so as to display to a target user;
  a selection accepting unit configured to accept selection of a position by the target user on the map image; and
  an output unit configured to acquire information sent by the other user associated with the position on the map image selected by the target user, and output to the target user.

Further a computer program as an aspect of the present invention includes instructions for causing an information processing apparatus to execute processes to:
  output a map image on which another user is associated with a predetermined position so as to display to a target user;
  accept selection of a position by the target user on the map image; and
  acquire information sent by the other user associated with the position on the map image selected by the target user, and output to the target user.

Further a communication system as an aspect of the present invention is a communication system which includes a target user terminal operated by a target user, another user terminal operated by another user, and a server apparatus connected to the target user terminal and the other user terminal via a network and in which the server apparatus includes:
  a map display unit configured to output a map image on which another user is associated with a predetermined position so as to display to a target user;
  a selection accepting unit configured to accept selection of a position by the target user on the map image; and
  an output unit configured to acquire information sent by the other user associated with the position on the map image selected by the target user, and output to the target user.

Advantageous Effects of Invention

With the configurations as described above, the present invention enables casual online communication.

BRIEF DESCRIPTION OF DRAWINGS

FIG. 14 is a flowchart showing operation of the communication apparatus in the second example embodiment of the present invention.

DESCRIPTION OF EMBODIMENTS

First Example Embodiment

Figure 1:
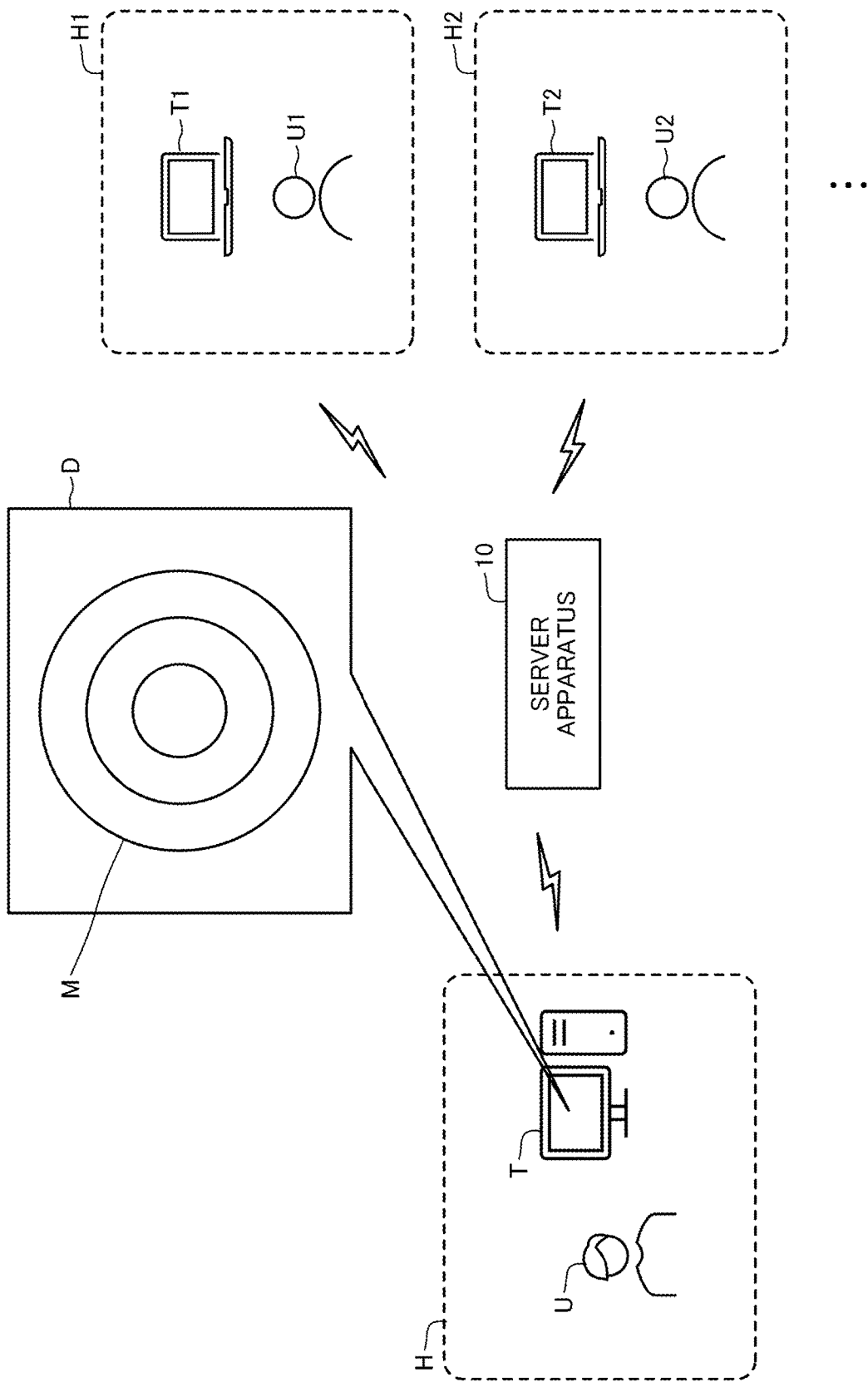
FIG. 1 is a schematic view showing an overall configuration of a communication system in a first example embodiment of the present invention.
Figure 2:
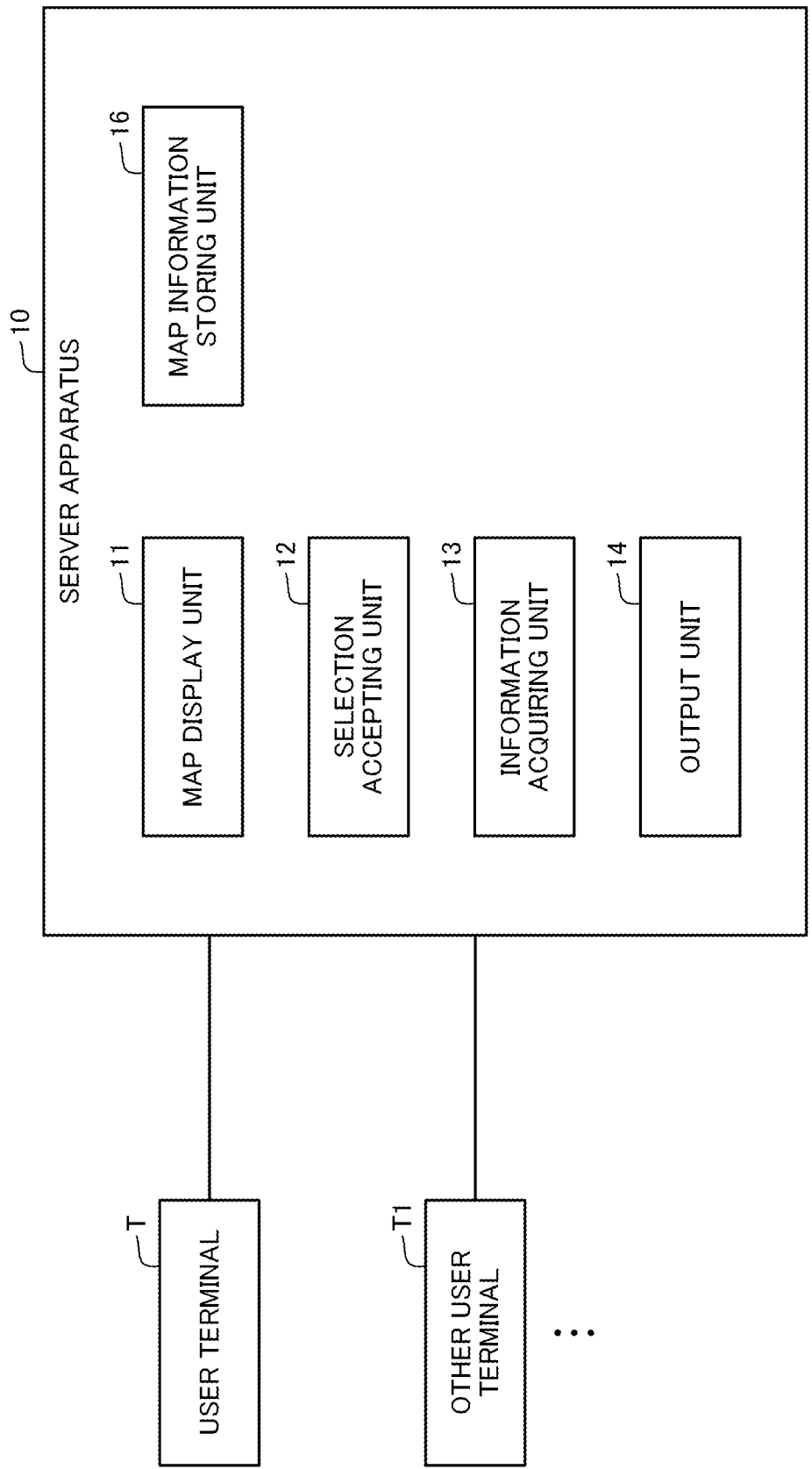
FIG. 2 is a block diagram showing a configuration of a server apparatus disclosed in FIG. 1.

A first example embodiment of the present invention will be described with reference to FIGS. 1 to 11. FIGS. 1 and 2 are views for describing a configuration of a communication system, and FIGS. 3 to 11 are views for describing processing operation of the communication system.

[Configuration]

A communication system according to the present invention is for enabling casual communication with others in an online business environment within an organization such as a company. For example, a case where the communication system of this example embodiment is used by employees of a company, especially, employees who telework at home as users and is used for casual communication between the users will be described. However, the communication system according to the present invention is not necessarily limited to use in an organization such as a company, and may be used in any organization such as organizations formed in a school and a community, and may be used among users who do not form an organization, such as a group of users visiting a shop or an event.

As shown in FIG. 1, the communication system includes a server apparatus 10 and a plurality of user terminals T, T1 and T2 connected to the server apparatus 10 via a network. Here, it is assumed that the user terminals include the user terminal T (target user terminal) that is an information processing terminal operated by a target user U and the user terminals T1 and T2 (other user terminals) that are information processing terminals operated by other users U1 and U2 who are different from the target user U. Meanwhile, it is assumed that the target user U and the other users U1 and U2 are employees of the same company and they all telework at their own homes H, H1 and H2. However, the target user U and the other users U1 and U2 are not necessarily limited to working at the homes H, H1 and H2, and may work at any places. Moreover, the other users U1 and U2 are not limited to the two users shown in the view, and there may be more other users, and user terminals of the other users may also be connected to the server device 10. Below, configurations of the server apparatus 10 and the user terminals T, T1 and T2 will be described in detail.

First, the user terminals T, T1 and T2 are formed of general information processing terminals, such as a personal computer and a tablet, each including an arithmetic logic unit and a memory unit and also including an output unit and an input unit such as a display, a mouse, a keyboard, a speaker and a microphone. Then, the user terminals T, T1 and T2 are connected to the server apparatus 10 via the network, respectively, and the user terminals T, T1 and T2 each have functions of outputting information transmitted from the server apparatus 10, such as a map image and information sent by another user to be described later, through the display and the speaker, and of transmitting input information such as position selection on the map image to the server apparatus 10.

Further, the user terminals T, T1 and T2 each have a function of transmitting information sent by the users themselves and input to the user terminals T, T1 and T2 to the server apparatus 10. For example, the user terminals T, T1 and T2 each acquire voice information uttered by the operating user himself/herself through the microphone and transmit the voice information to the server apparatus 10. Moreover, the user terminals T, T1, and T2 each acquire text information input through the keyboard by the operating user himself/herself performing message exchange such as chatting with another user, and transmit the text information the server apparatus 10. Thus, the user terminals T, T1 and T2 each have a function of transmitting voice information and text information sent by the operating user to the server apparatus 10.

In this example embodiment, a case where, of the users shown in FIG. 1, the target user U communicates with the other users U1 and U2 will be mainly described as an example. Therefore, hereinafter, an example of screen information displayed on a display D of the user terminal T operated by the target user U will be mainly illustrated to describe in detail the functions of the user terminals T, T1 and T2 and the server apparatus 10.

The abovementioned server apparatus 10 (communication apparatus) is formed of one or a plurality of information processing apparatuses each including an arithmetic logic unit and a memory unit. Then, as shown in FIG. 2, the server apparatus 10 includes a map display unit 11, a selection accepting unit 12, an information acquiring unit 13, and an output unit. The map display unit 11, the selection accepting unit 12, the information acquiring unit 13, and the output unit 14 can be realized by the arithmetic logic unit executing a program for realizing the respective functions stored in the memory unit. The server apparatus 10 also includes a map information storing unit 16. The map information storing unit 16 is formed of the memory unit. Below, the respective components will be described in detail.

The abovementioned map information storing unit 16 stores user information that is information about the users. For example, the user information includes identification information, names and photographs as information identifying the users, and information such as departments, groups and teams to which the users belong in the company as information representing the attributes of the users.

Figure 3:
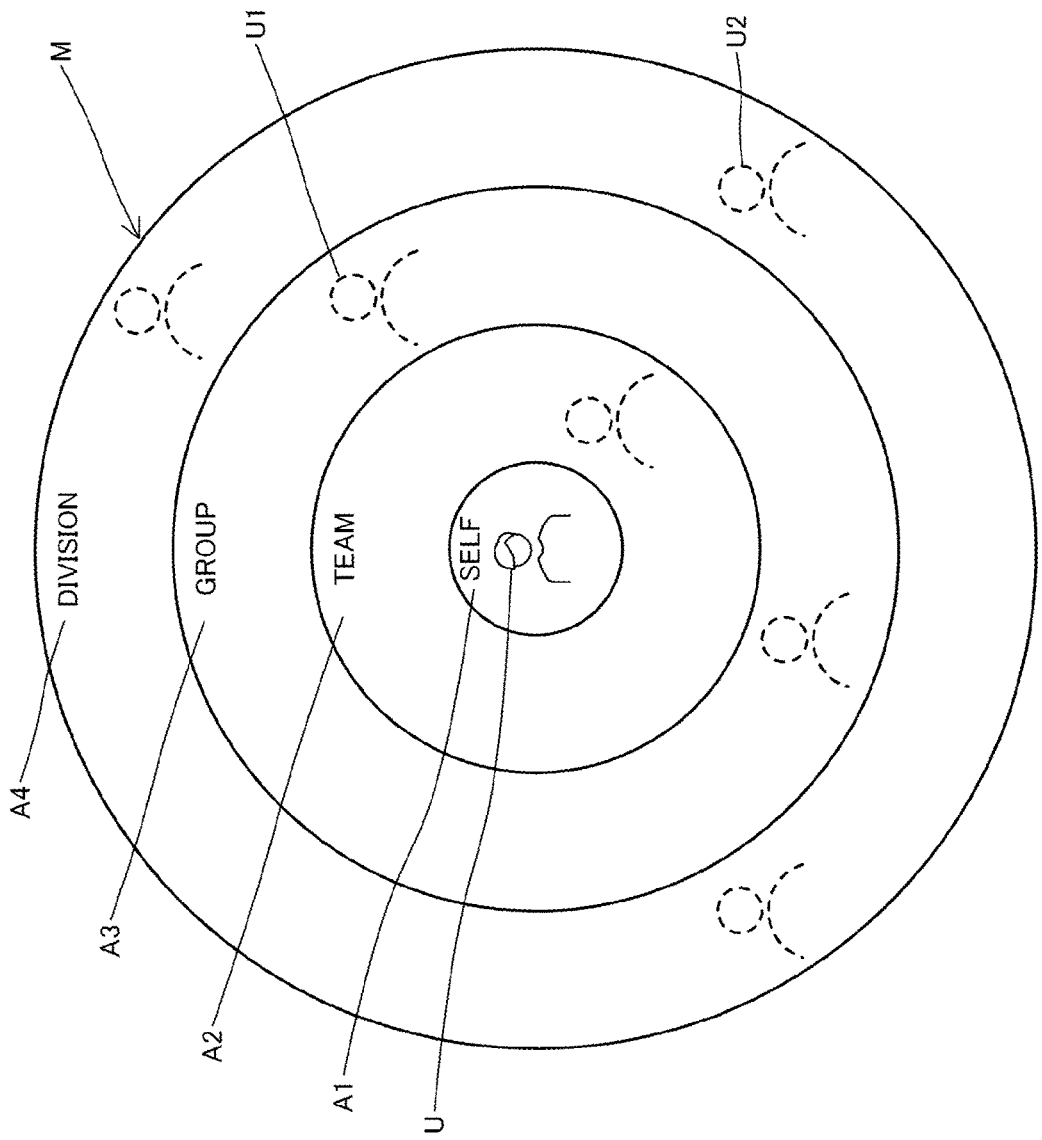
FIG. 3 is a view showing an example of an image displayed on a target user terminal by the server apparatus disclosed in FIG. 1.

The map information storing unit 16 also stores map setting information as the user information. For example, the map setting information includes "setting of regions on map image", "setting of whether or not to display user when selected", "setting of type of transmitted information to be disclosed", and the like. For example, "setting of regions on map image" represents the setting of a region for each attribute of another user displayed on the map image. Here, the map image is formed in a shape such that a plurality of circles with different radii are overlapped as shown in FIG. 3, and the attributes of other users are assigned to the respective annular regions. As an example, the setting of regions on the map image of the target user U shown in FIG. 3 is setting such that the self is at the center and the annular region farther from the center has a less relation with the affiliation of the self. Moreover, as will be described later, "setting of whether or not to display user when selected" is the setting of, when the user selected by another user on the map image, whether or not to display information identifying the user such as name and photograph in a popup screen on the map image of the other user. Moreover, as will be described later, "setting of type of transmitted information to be disclosed" is the setting such that, when the user is selected by another user on the map image, whether to select voice information or text information as transmission information to be transmitted to the other user via the server apparatus 10. Meanwhile, the map information storing unit 16 may further store other information about the user.

The map display unit 11 generates map images to be displayed on the user terminals T, T1 and T2 for the respective users U, U1 and U2 based on the user information stored in the map information storing unit 16 described above, and outputs so as to display on the respective user terminals. FIG. 3 shows a map image M displayed on the user terminal T of the target user U. As shown in this view, the map display unit 11 first sets regions for the respective attributes of other users within the map image M based on the setting of the user information of the target user U. As an example, in the map image M of the target user U shown in FIG. 3, self A1 is at the center, and regions for team A2, group A3 and division A4 are set in this order in annular regions that become farther from the center. Thus, the map image M of the target user U is such that the self is at the center and the annular region farther from the center has a less relation with to the affiliation of the self.

Further, the map display unit 11 sets so as to associate the other users U1 and U2 with predetermined positions on the map image M displayed to the target user U. Here, the map display unit 11 associates the other users U1 and U2 with predetermined positions in the regions on the map image M corresponding to the attributes of the other users U1 and U2 with respect to the target user U. In the example of FIG. 3, the map display unit 11 associates another user belonging to the same team as the target user U with a predetermined position within the region of team A2 outside the region of self A1 of the target user U, associates the other user U1 belonging to the same group as the target user U with a predetermined position within the region of group A3 outside the region of team A2, and associates the other user U2 belonging to the same division as the target user U with a predetermined position within the region of division A4 outside the region of group A3. The positions where other users are associated within the respective regions are set at random within the regions. However, the map display unit 11 may set the positions where other users are associated within the respective regions based on other standards. As an example, the map display unit 11 may associate other users with positions arranged at equal intervals within the respective regions.

The map display unit 11 does not display any information identifying another user associated on the map image M. That is, in the example of FIG. 3, the other users U1 and U2 associated with the predetermined positions on the map image M are illustrated by dotted-line humanoid figures, but the map display unit 11 does not display any information indicating the other users U1 and U2 on the actual map image M. Therefore, the target user U cannot recognize the positions of the other users U1 and U2 associated on the map image M.

Figure 4:
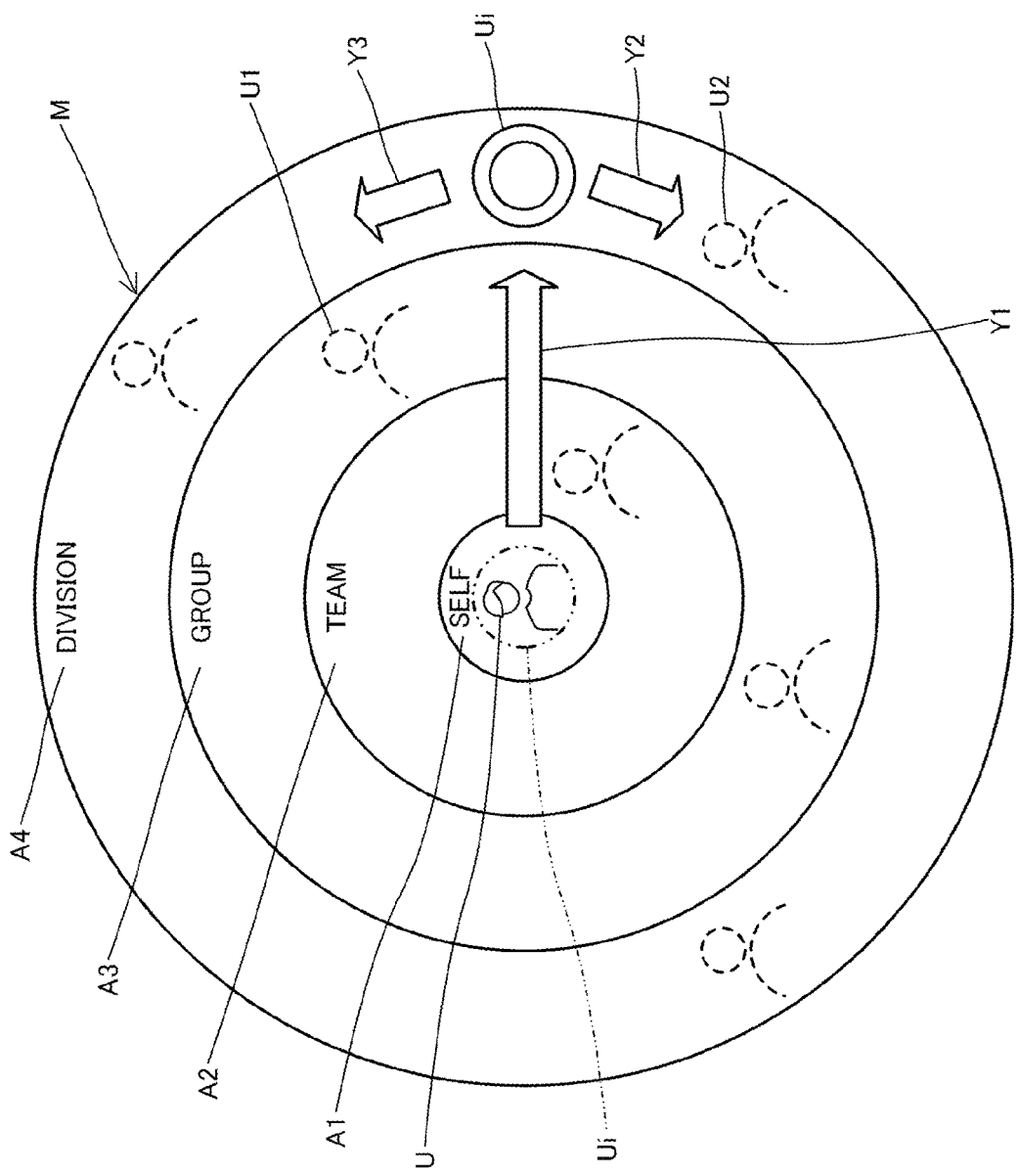
FIG. 4 is a view showing an example of an image displayed on the target user terminal by the server apparatus disclosed in FIG. 1.

The selection accepting unit 12 displays an icon Ui that can be moved on the map image M by the target user U operating the user terminal T as denoted by symbol Ui in FIG. 4. For example, the icon Ui is displayed with the center position where the target user U is associated on the map image M as the initial position, and can be moved on the map image M as indicated by arrows Y1, Y2 and Y3 by the target user U operating on the user terminal T with a mouse, a stylus pen or the like. Then, the selection accepting unit 12 accepts the position of the icon Ui as a position selected by the target user U. The selection accepting unit 12 may automatically move the position of the icon Ui with a preset behavior. For example, after the target user U operates and moves the icon Ui to a predetermined region, the selection accepting unit 12 may automatically move the icon Ui so as to cruise in the whole region. As an example, as shown in FIG. 4, after the target user U moves the icon Ui to the region of division A4 on the map image M, the selection accepting unit 12 may automatically move the icon Ui so as to go around along the annular shape within the region of division A4.

In a case where the other user U1, U2 is associated with a position on the map image M selected by the target user U where the icon Ui is located, the information acquiring unit 13 (output unit) acquires information sent by the other user U1, U2. For example, the information acquiring unit 13 acquires voice information and text information sent by the other user U1, U2 having been input to the user terminal T1, T2 of the other user U1, U2, from the user terminal T1, T2. As an example, the information acquiring unit 13 acquires the contents of a monologue uttered by the other user U1, U2 and a conversation with still another user, and the contents of message exchange with still another user input by the other user U1, U2 to the user terminal T1, T2. Meanwhile, the information acquiring unit 13 may acquire information sent by all the users at all times and, as will be described later, the output unit 14 may check the amount of information sent per unit time at an associated position of each of the users.

In a case where the other user U1, U2 is associated with a position on the map image M where the icon Ui is located selected by the target user U, the output unit 14 outputs information sent by the other user U1, U2 acquired by the information acquiring unit 13 described above to the user terminal T of the target user U. For example, the output unit 14 transmits voice information and text information acquired from the user U1, U2 associated with the position of the icon Ui to the user terminal T of the target user U so as to output from the user terminal T. In particular, the output unit 14 retrieves the user information of the other user U1, U2 from the map information storing unit 16, and transmits information (voice information or text information) set as a kind of transmission information to be disclosed, to the user terminal T of the target user U. Meanwhile, the output unit 14 may output information identifying the other user U1, U2 associated with the position of the icon Ui so as to display in the position of the icon Ui on the map image displayed to the target user U. The output unit 14 retrieves the user information of the other user U1, U2 from the map information storing unit 16 and, only when it is set to display user when selected, output so as to display the name and photograph of the other user U1, U2 as the information identifying the other user U1, U2.

Figure 5:
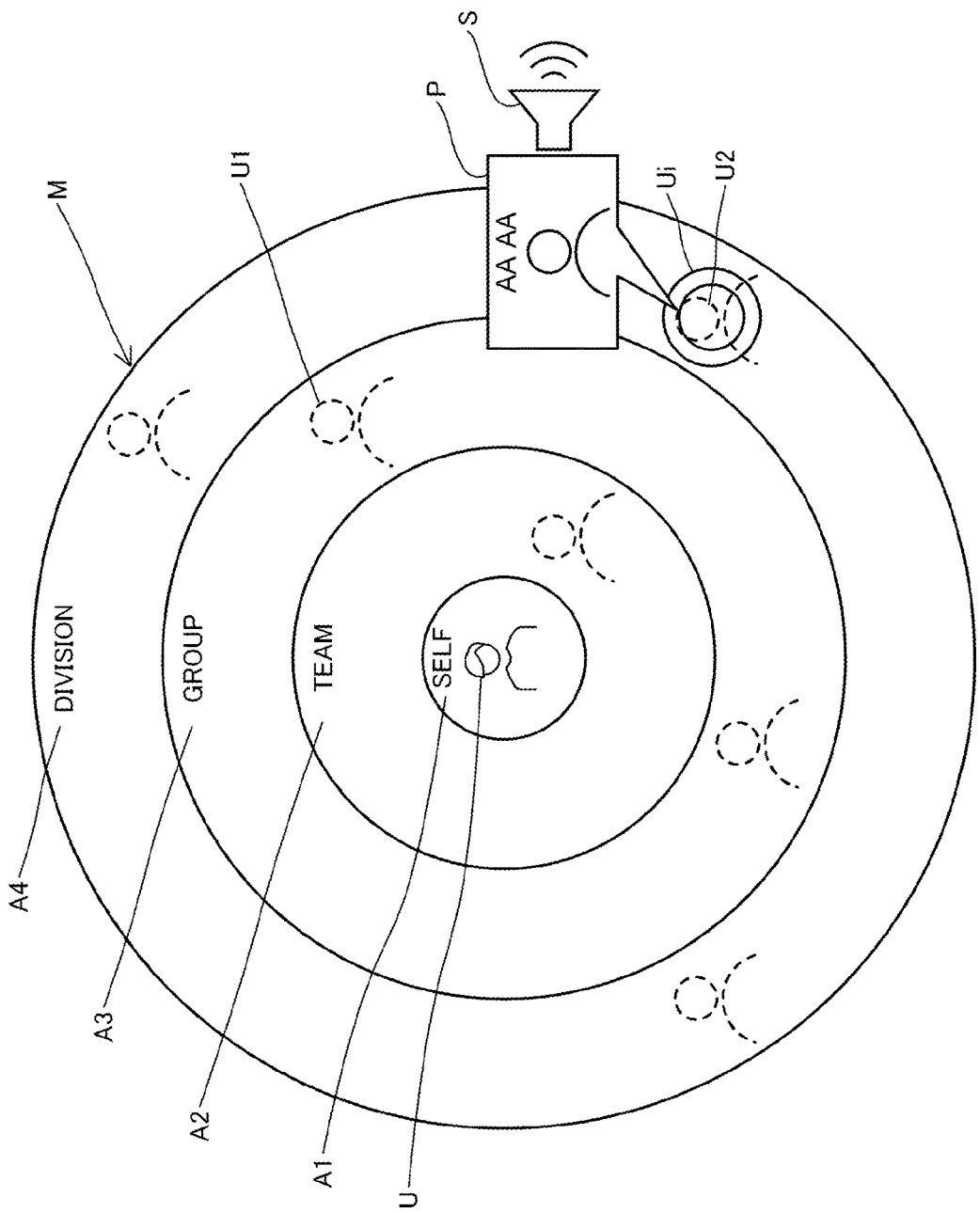
FIG. 5 is a view showing an example of an image displayed on the target user terminal by the server apparatus disclosed in FIG. 1.
Figure 6:
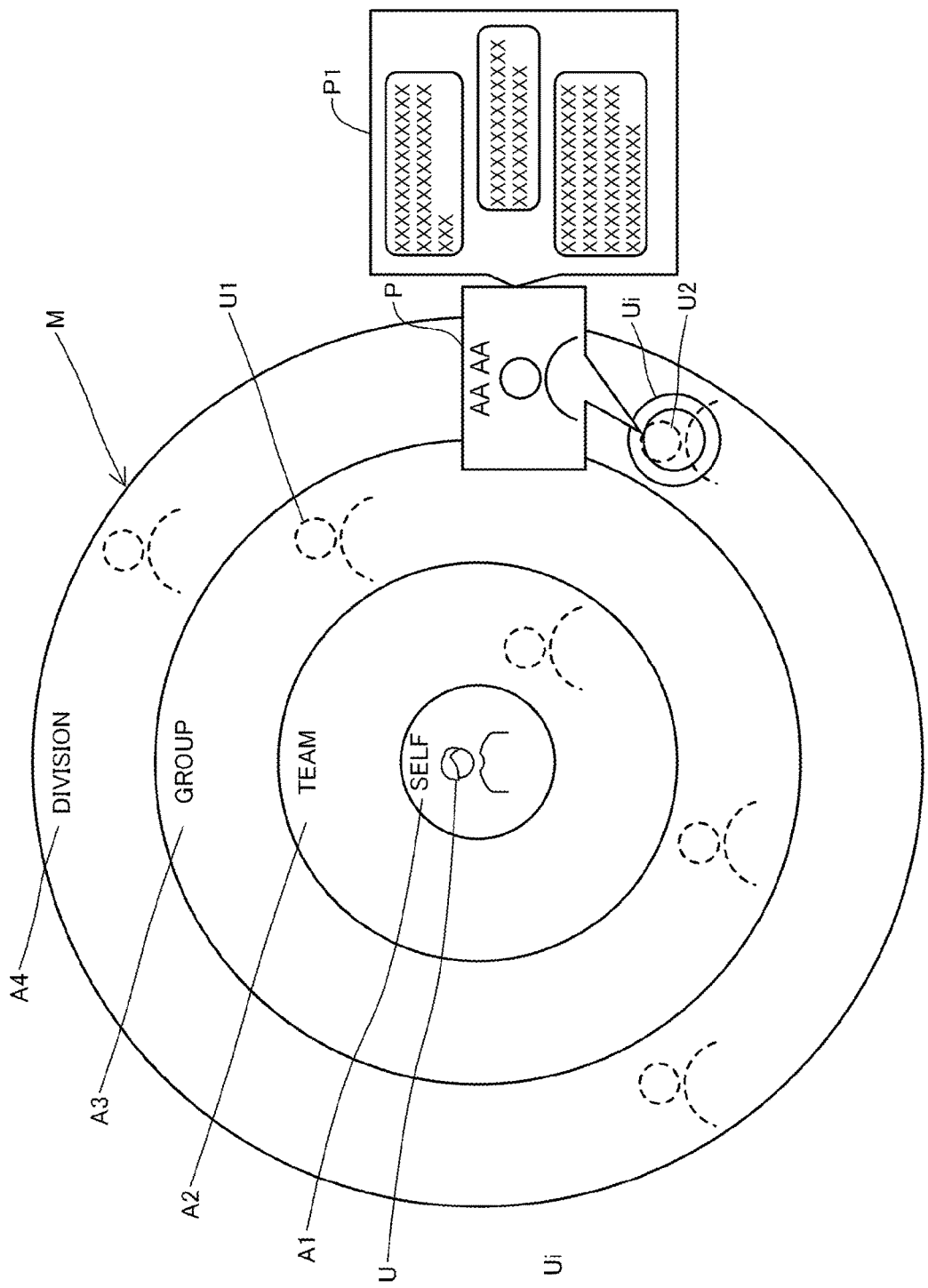
FIG. 6 is a view showing an example of an image displayed on the target user terminal by the server apparatus disclosed in FIG. 1.

Here, a case where the position of the icon U1 is moved to a position associated with the other user U2 by the operation of the target user U or by automatic movement will be described. As an example, as shown in FIG. 5, the output unit 14 outputs so as to display "name (AAAA) and photograph" as information identifying the other user U2 in a popup screen P at the position of the icon Ui on the map image M displayed on the display D of the user terminal T of the target user U, and further outputs so as to reproduce voice information S acquired from the other user U2 through the speaker of the user terminal T operated by the target user U. As another example, as shown in FIG. 6, the output unit 14 outputs so as to display "name (AAAA) and photograph" as information identifying the other user U2 in the popup screen P at the position of the icon Ui on the map image M displayed on the display D of the user terminal T operated by the target user U, and further outputs so as to display text information acquired from the other user U2 in a popup screen P1 on the display D of the target user U.

Figure 7:
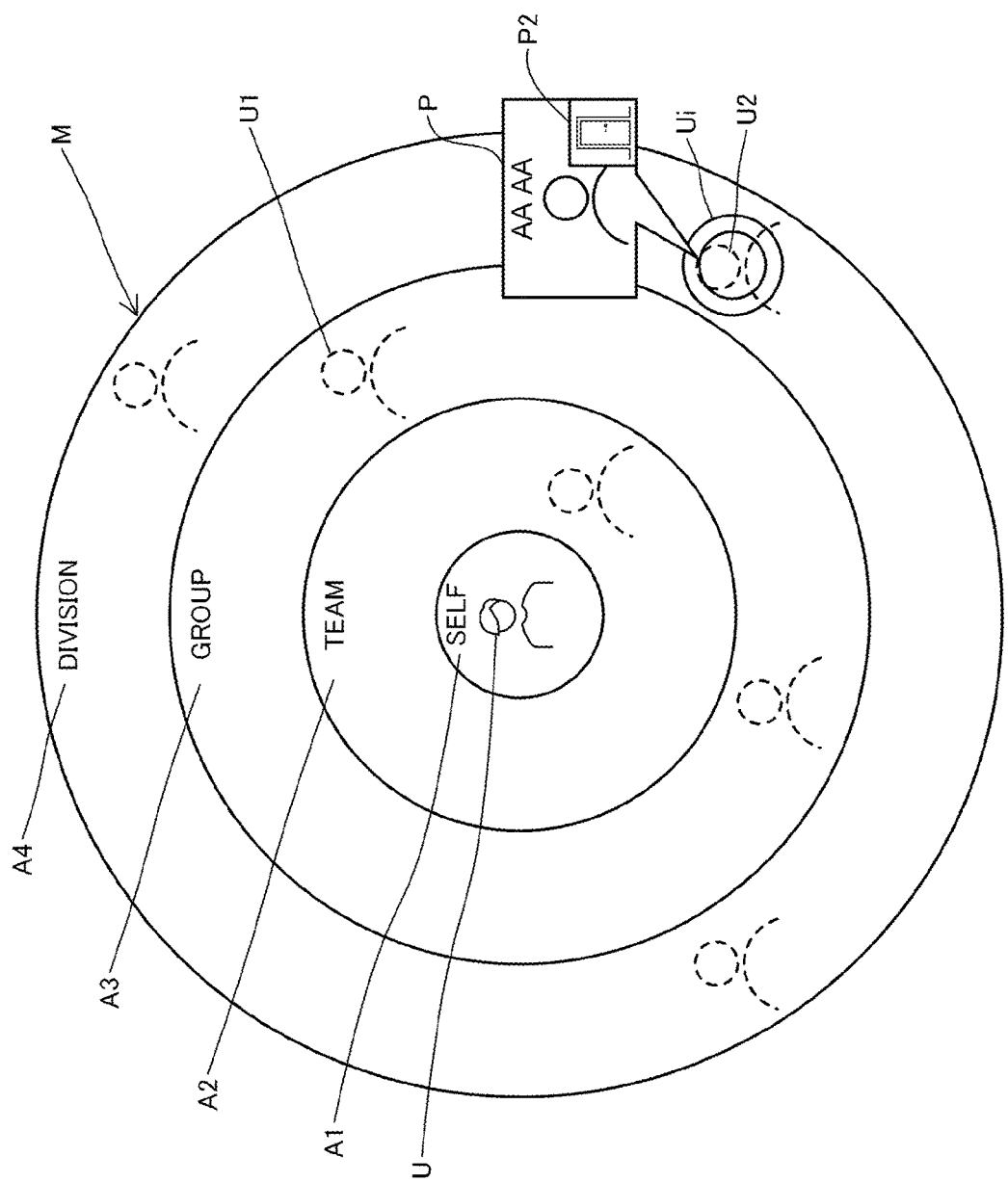
FIG. 7 is a view showing an example of an image displayed on the target user terminal by the server apparatus disclosed in FIG. 1.

Further, when displaying the information identifying the other user U2 in the popup screen P on the map image M as described above, the output unit 14 may display a communication request button P2 with which the target user U requests communication from the other user U2 as shown in FIG. 7. When the communication request button P2 is pressed by the target user U, the output unit 14 accepts a fact that the target user U has requested communication from the other user U2, and notifies the fact to the user terminal T2 of the other user U2. That is to say, the output unit 14 outputs so as to display information identifying the target user U (e.g., name and photograph) and also a fact that communication is requested by the target user U on the display of the user terminal T of the other user U2. Furthermore, the output unit 14 acquires voice information and text information sent by the target user U from the user terminal T of the target user U, and transmits so as to output from the user terminal T2 of the other user U2. Consequently, the target user U and the other user U2 can exchange voice information and text information with each other via their respective user terminals T and T2, and can have voice or chart conversations with each other.

Figure 8:
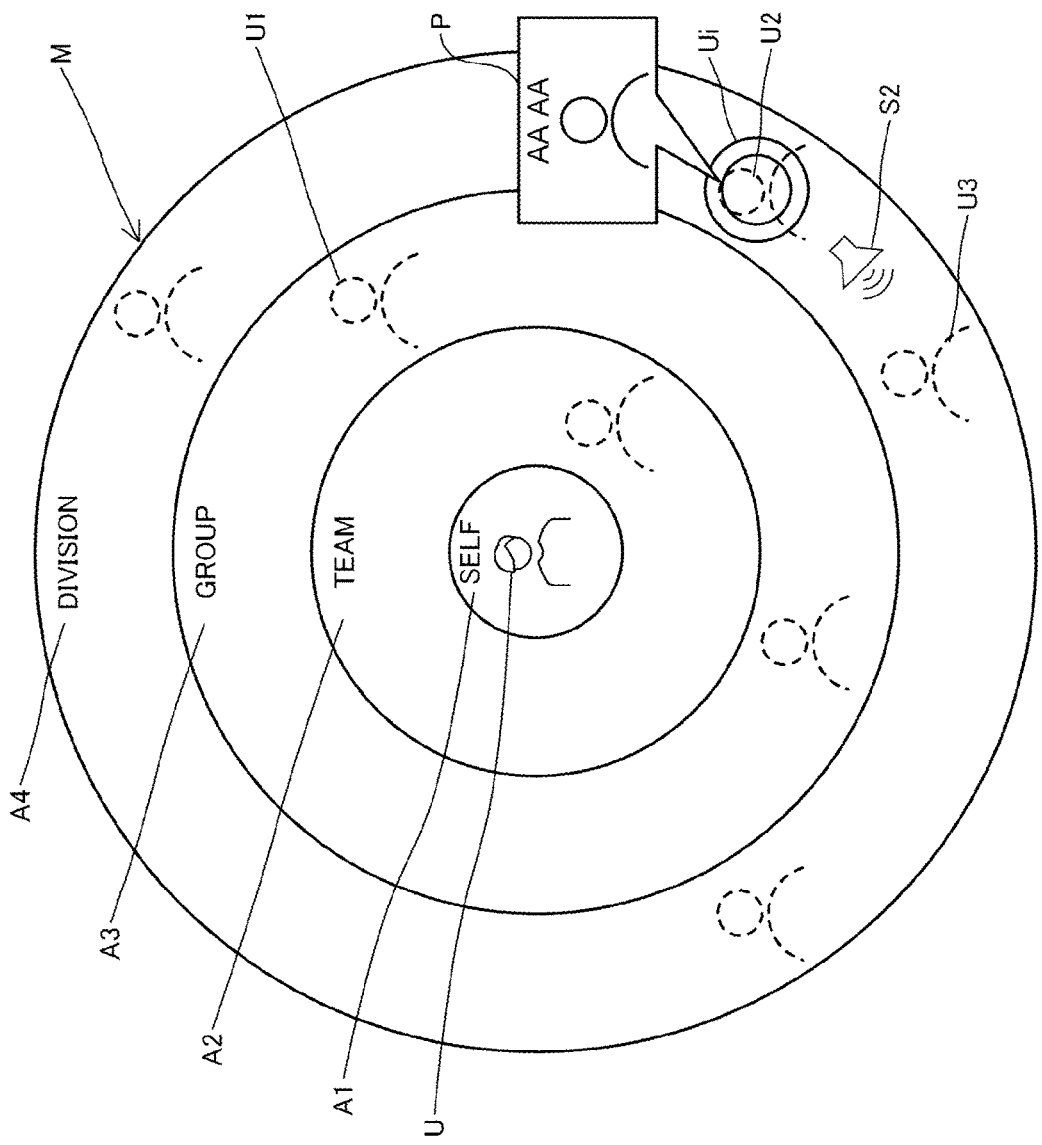
FIG. 8 is a view showing an example of an image displayed on the target user terminal by the server apparatus disclosed in FIG. 1.

Note that when the target user U and the other user U2 are exchanging voice information and text information by conversations and chats as described above, the output unit 14 may output the voice information and the text information to still another user. For example, as shown in FIG. 8, the output unit 14 transmits voice information and text information sent by the target user U and the other user U2 to a user terminal of still another user U3 associated with a position within a range of preset distance from the position where the other user U2 is associated on the map image M. Consequently, the user U3 can recognize conversations and chats between the target user U and the other user U2. The output unit 14 may output the conversations and the chats between the target user U and the other user U2 to still another user having another relation with the position where the other user U2 is associated on the map image M. For example, the output unit 14 may output the conversations and the chats between the target user U and the other user U2 to all other users located in the same annular shape (e.g., region of division A4) as the position where the other user U2 is associated and thereby located in the same attribute on the map image M.

Figure 9:
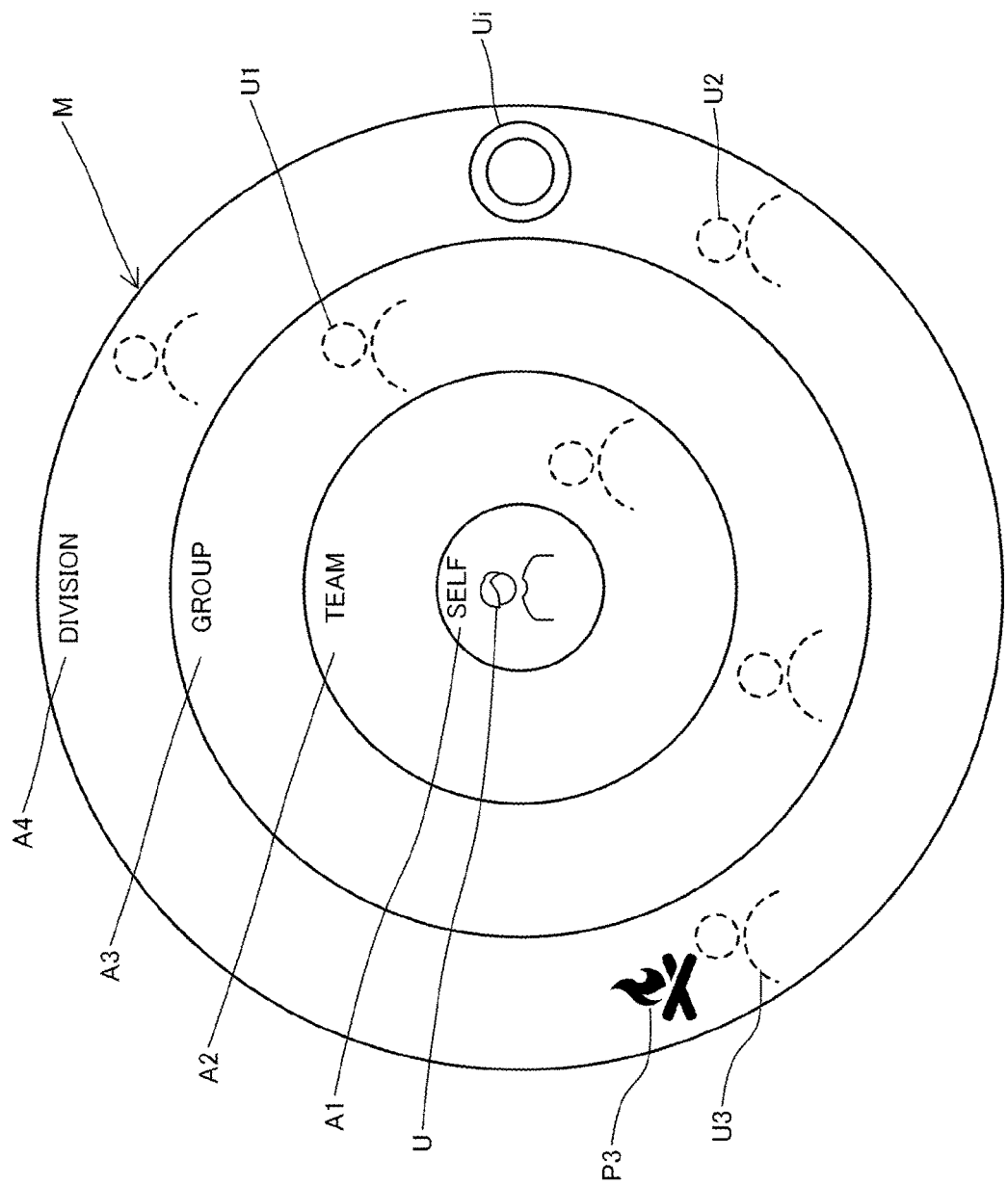
FIG. 9 is a view showing an example of an image displayed on the target user terminal by the server apparatus disclosed in FIG. 1.

Further, the output unit 14 may output so as to display information representing information transmission at a position associated with another user based on information sent by the other user on the map image M of the target user U. For example, the output unit 14 checks information sent by all other users acquired by the information acquiring unit 13 described above, and outputs so as to display information representing information transmission at a position on the map image M where another user having sent an amount of information per unit time equal to or more than a threshold value is associated. As an example, as shown in FIG. 9, in a case where the amount of information per unit time sent by another user U3 is equal to or more than a threshold value, the output unit 14 displays a figure representing information transmission as indicated by symbol P3 at a position on the map image M where the other user U3 is associated. Consequently, the target user U can recognize a position on the map image M where conversations and chats are made. Therefore, the target user U can move the icon Ui to the position where information transmission is performed and communicate with the other user U3 at the position. In order to realize the abovementioned function by the output unit 14, the information acquiring unit 13 acquires information sent by all other users at all times, and the output unit 14 checks the amount of information sent per unit time.

Figure 10:
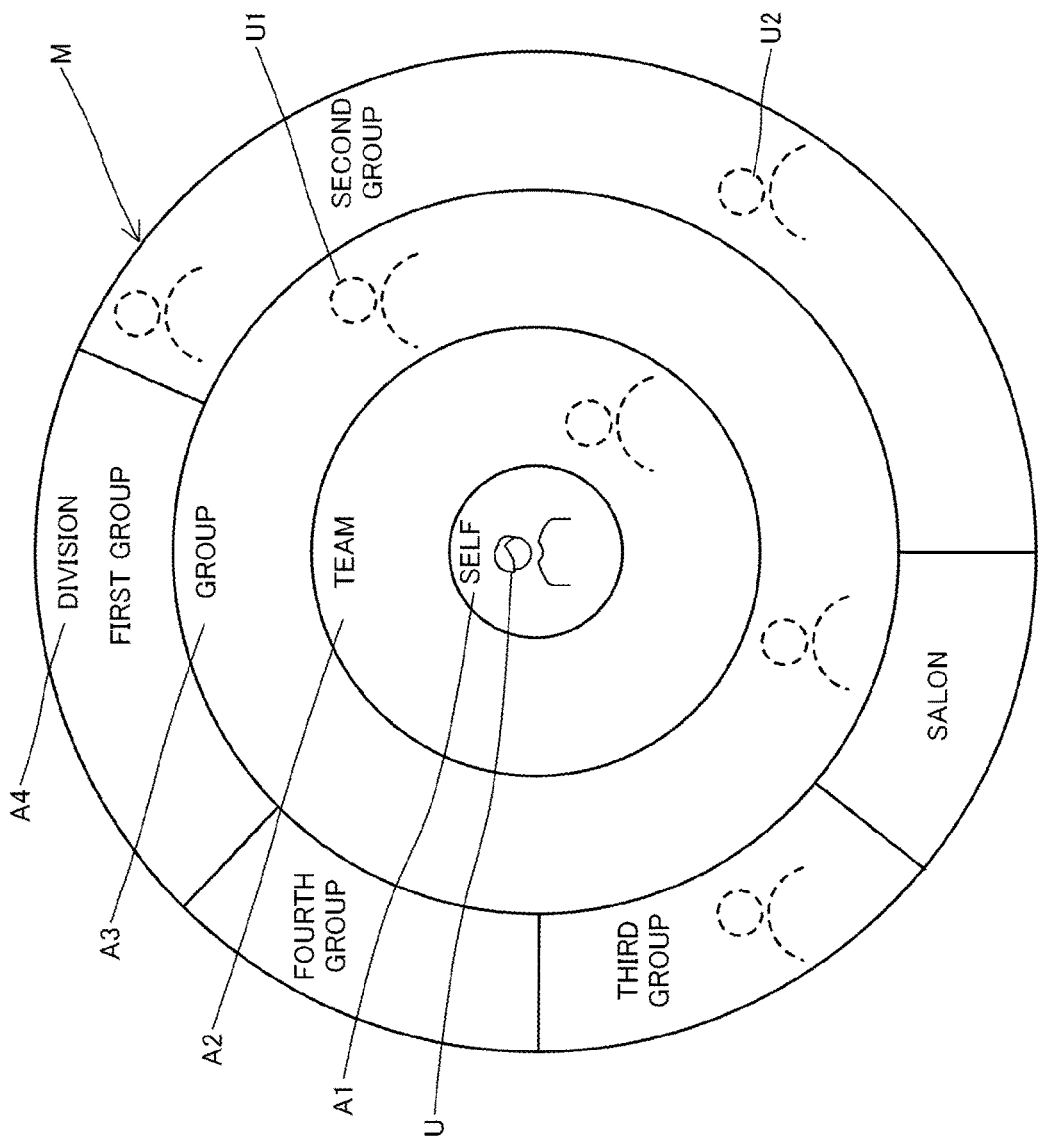
FIG. 10 is a view showing an example of an image displayed on the target user terminal by the server apparatus disclosed in FIG. 1.

The map display unit 11 described above is not necessarily limited to displaying the map image M with the annular regions set as shown in FIG. 3 and others, and may set regions having any shapes on the map image M. For example, the map display unit 11 may further divide the annular region into a plurality of regions in a circumferential direction, and assign the attribute of the user to each of the regions as shown in FIG. 10.

[Operation]

Figure 11:
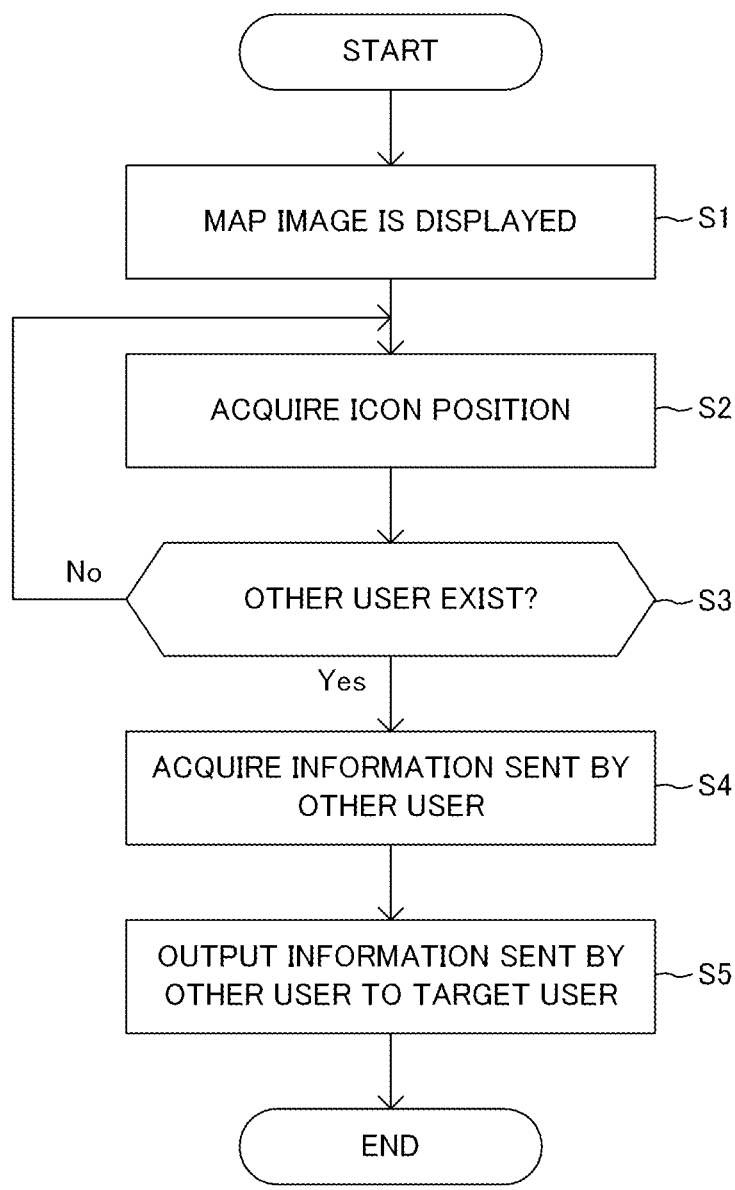
FIG. 11 is a flowchart showing operation of the server apparatus disclosed in FIG. 1.

Next, operation of the above communication system, especially, operation of the server apparatus 10 will be described mainly with reference to a flowchart of FIG. 11. This operation description mainly shows a state in which the target user U communicates with another user.

First, when the target user U accesses the server apparatus 10 with the user terminal T, the server apparatus 10 refers to the user information of all the users stored in the map information storing unit 16, generates the map image M corresponding to the target user U, and transmits so as to display on the user terminal T. Consequently, the map image M as shown in FIG. 3 is displayed on the display D of the user terminal T operated by the target user U (step S1). Specifically, the map image M generated by the server apparatus 10 has a substantially circular shape on the whole, self A1 serving as the target user U is displayed at the center, and the annular regions of team A2, group A3 and division A4 are set and displayed in this order from the center as the distance from the center increases. With predetermined positions in the respective regions of the map image M, the other users U1 and U2 belonging to attributes corresponding to the respective regions are associated. As an example, another user belonging to the same team as the target user U is associated with a predetermined position within the region of team A2 outside the region of self A1 of the target user U, the other user U1 belonging to the same group as the target user U is associated with a predetermined position within the region of group A3 outside the region of team A2, and the other U2 belonging to the same division as the target user U is associated with a predetermined position within the region of division A4 outside the region of group A3. Here, the server apparatus 10 does not display any information representing the other users on the map image M. Therefore, when the target user U sees the map image M, the target user U cannot recognize the positions with which the other users U1 and U2 are associated.

Then, as shown in FIG. 4, the server apparatus 10 displays the movable icon Ui on the map image M displayed on the user terminal T, and acquires the position of the icon Ui on the map image M as a position selected by the target user U (step S2). The icon Ui can be moved by the operation of the target user U, and is also moved automatically with a preset behavior. Here, it is assumed that the icon Ui is moved by the operation of the target user U from the region of self A1 to the region of division A4 as indicated by arrow Y1 in FIG.

4 and is moved within the region of division A4 along the annular shape as indicated by arrow Y2.

The server apparatus 10 acquires the position of the icon Ui on the map image M at all times, and checks whether or not the position of the icon Ui is located at a position where another user is associated (step S3). Then, when the icon Ui is located at a position where another user is associated on the map image M as shown in FIG. 5 (Yes at step S3), the server apparatus 10 acquires information sent by the other user (step S4). For example, when the icon Ui is located at the position where the other user U2 is associated, the server apparatus 10 acquires voice information and text information sent by the other user U2 input to the user terminal T2 of the other user U2. As an example, the server apparatus 10 acquires the contents of monologues uttered by the other user U2 and conversations with still another user, and the contents of message exchange with still another user input to the user terminal T2 by the other user U2.

Then, the server apparatus 10 outputs the acquired information sent by the other user U2 from the user terminal T of the target user U (step S5). For example, the server apparatus 10 transmits so as to output voice information such as monologues and conversations sent by the other user U2 through the speaker of the user terminal T of the target user U as shown in FIG. 5, and display and output text information input in message exchange and the like by the other user U2 on the display of the user terminal T of the target user U as shown in FIG. 6. As shown in FIGS. 5 and 6, the server apparatus 10 may display name and photograph, which are information identifying the other user U2, in the popup screen P at the position where the other user U2 is associated on the map image M displayed on the user terminal T of the target user U. The server apparatus 10 does not notify the user terminal T2 operated by the other user U2 that the information sent by the other user U2 is being output to the target user U. Consequently, the target user U can acquire voice information and text information sent by the other user incidentally, and can communicate.

Further, as shown in FIG. 7, the server apparatus 10 displays the communication request button P2 requesting communication from the other user U2 on the map image M of the target user U and, when the communication request button P2 is pressed by the target user U, accepts the request for communication from the other user U2 by the target user U. Then, the server apparatus 10 may notify the request for communication to the user terminal T2 of the other user U2 and set so that the target user U and the other user U2 can communicate with each other. For example, the server apparatus 10 may set so that the target user U and the other user U2 can exchange voice information and text information with each other via the user terminal T of the target user U and the user terminal T2 of the other user U2. Consequently, the target user U can incidentally have a voice or chat conversation with another user, and can casually communicate.

Meanwhile, while the target user U and the other user U2 are exchanging voice information and text information by conversations and chats, the server apparatus 10 may output the voice information and the text information to still another user as indicated by symbol S2 in FIG. 8. For example, the server apparatus 10 may transmit voice information and text information sent by the target user U and the other user U2 to a user terminal of still another user U3 located in the vicinity of the position where the other user U2 is associated on the map image M. Consequently, the other user U3 can recognize the conversations and chats between the target user U and the other user U2, and communication expands.

Further, the server apparatus 10 may acquire information sent by other users at all times, and output so as to display information representing information transmission at a position on the map image M where another user who makes many conversations and chats is associated. For example, the server apparatus 10 outputs so as to display information representing information transmission at a position where another user U3 performing information transmission on the map image M displayed to the target user U as indicated by symbol P3 in FIG. 9. Consequently, the target user U can recognize a position on the map image M where conversations and chats are made, and can move the icon Ui to the place as necessary to have communication with still another user U3.

As described above, in this example embodiment, the map image M, which is a virtual space where other users are associated in a hidden state, is displayed to the target user U, and information sent by another user associated with a position selected with the icon Ui by the target user U is output to the target user U. Consequently, the target user U can incidentally acquire information sent another user, and can casually have communication. Moreover, the target user U can exchange information with another user, and can more casually have communication.

Although a case where the map image M has a circular shape has been described above as an example, the map image M may have any two-dimensional shape. Besides, the map image M is not limited to having a two-dimensional shape, and may have a three-dimensional shape, for example, have a spherical surface.

Second Example Embodiment

Figure 12:
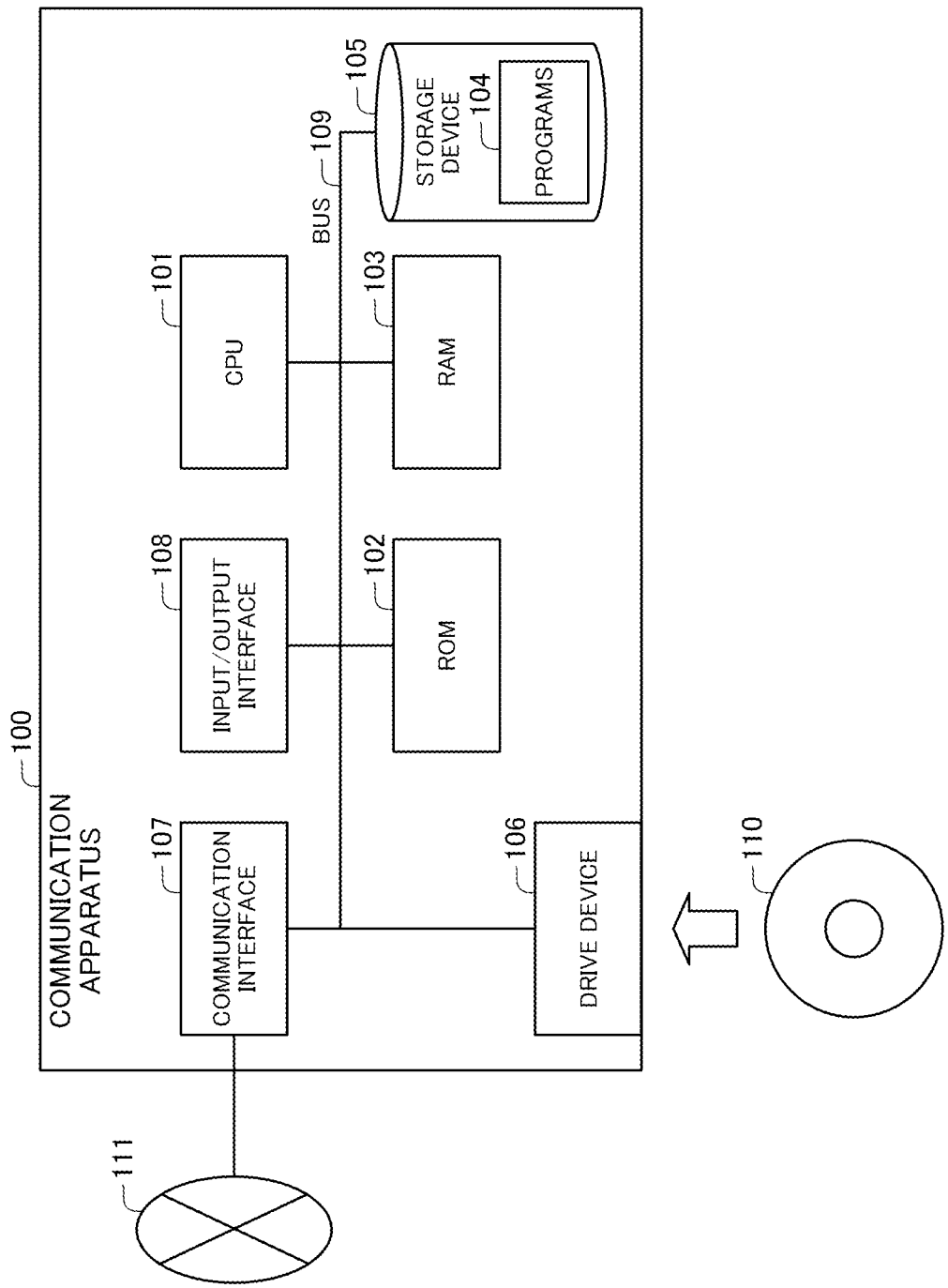
FIG. 12 is a block diagram showing a hardware configuration of a communication apparatus in a second example embodiment of the present invention.
Figure 13:
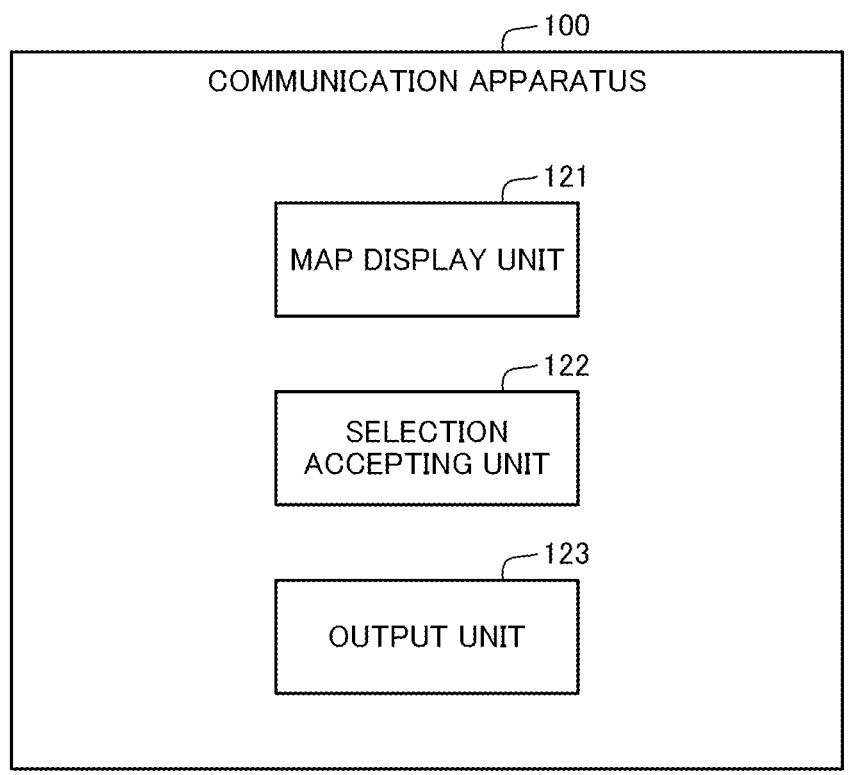
FIG. 13 is a block diagram showing a configuration of the communication apparatus in the second example embodiment of the present invention.

Next, a second example embodiment of the present invention will be described with reference to FIGS. 12 to 14. FIGS. 12 and 13 are block diagrams showing a configuration of a communication apparatus in the second example embodiment, and FIG. 14 is a flowchart showing operation of the communication apparatus. In this example embodiment, the overview of the configurations of the communication apparatus and the communication method described in the above example embodiment will be shown.

First, with reference to FIG. 12, a hardware configuration of a communication apparatus 100 in this example embodiment will be described. The communication apparatus 100 is configured by a general information processing apparatus and, as an example, has the following hardware configuration including a CPU (Central Processing Unit) 101 (arithmetic logic unit),
a ROM (Read Only Memory) 102 (memory unit),
a RAM (Random Access Memory) 103 (memory unit),
programs 104 loaded to the RAM 103,
a storage device 105 storing the programs 104,
a drive device 106 reading into and writing from a storage medium 110 outside the information processing apparatus,
a communication interface 107 connected to a communication network 111 outside the information processing apparatus,
an input/output interface 108 performing input and output of data, and
a bus 109 connecting the components.

Then, the communication apparatus 100 can structure and include a map display unit 121, a selection accepting unit 122 and an output unit 123 shown in FIG. 13 by acquisition and execution of the programs 104 by the CPU 101. The programs 104 are, for example, stored in the storage device 105 and the ROM 102 in advance, and are loaded to the RAM 103 and executed by the CPU 101 as necessary. Moreover, the programs 104 may be supplied to the CPU 101 via the communication network 111, or may be stored in the storage medium 110 in advance to be retrieved by the drive device 106 and supplied to the CPU 101. However, the map display unit 121, the selection accepting unit 122 and the output unit 123 described above may be structured by a dedicated electronic circuit for realizing such means.

FIG. 12 shows an example of the hardware configuration of the information processing apparatus serving as the communication apparatus 100, and the hardware configuration of the information processing apparatus is not limited to the above case. For example, the information processing apparatus may be configured by part of the above configuration, for example, without the drive device 106.

Then, the communication apparatus 100 executes a communication method shown in the flowchart of FIG. 14 by the functions of the map display unit 121, the selection accepting unit 122 and the output unit 123 structured by the programs as described above.

As shown in FIG. 14, the communication apparatus 100 executes processes to
  output a map image on which another user is associated with a predetermined position so as to display to a target user (step S101),
  accept selection of a position by the target user on the map image (step S102), and
  acquire information sent by the other user associated with the position on the map image selected by the target user and output to the target user (step S103).

With the configuration as described above, the present invention displays a map image, which is a virtual space in which another user is associated, to a target user, and outputs information sent by another user associated with a position selected by the target user to the target user. Consequently, the target user can incidentally acquire information sent by another user and can casually have communication.

The programs described above can be stored using various types of non-transitory computer-readable mediums and supplied to a computer. The non-transitory computer-readable mediums include various types of tangible storage mediums. Examples of the non-transitory computer-readable mediums include a magnetic recording medium (e.g., flexible disk, magnetic tape, hard disk drive), a magnetooptical recording medium (e.g., magnetooptical disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)). The programs may also be supplied to a computer by various types of transitory computer-readable mediums. The transitory computer-readable mediums include an electric signal, an optical signal, and an electromagnetic wave. The transitory computer-readable mediums can supply the programs to the computer via a wired channel such as an electric line and an optical fiber or via a wireless channel.

Although the present invention has been described above with reference to the example embodiments and the like, the present invention is not limited to the example embodiments described above. The configurations and details of the present invention can be changed in various manners that can understood by one skilled in the art within the scope of the present invention. Moreover, at least one or more functions of the functions of the map display unit 121, the selection accepting unit 122 and the output unit 123 described above may be executed by an information processing apparatus installed and connected at any place on a network, that is, may be executed by cloud computing.

SUPPLEMENTARY NOTES

The whole or part of the example embodiments disclosed above can be described as the following supplementary notes. Below, the overview of configurations of a communication method, a communication apparatus, and a program according to the present invention will be described. However, the present invention is not limited to the following configurations.

(Supplementary Note 1)
  A communication method comprising:
    outputting a map image on which another user is associated with a predetermined position so as to display to a target user;
    accepting selection of a position by the target user on the map image; and
    acquiring information sent by the other user associated with the position on the map image selected by the target user, and outputting to the target user.

(Supplementary Note 2)
  The communication method according to Supplementary Note 1, comprising:
    accepting a position of an icon movably displayed on the map image as the position selected by the target user; and
    acquiring information sent by the other user associated with the position of the icon, and outputting to the target user.

(Supplementary Note 2.1)
  The communication method according to Supplementary Note 2, comprising
    automatically moving the position of the icon on the map image with a preset behavior, and accepting the moved position of the icon as the position selected by the target user.

(Supplementary Note 2.2)
  The communication method according to any of Supplementary Notes 1 to 2.1, comprising
    without displaying information identifying the other user on the map image, outputting the map image so as to display to the target user.

(Supplementary Note 3)
  The communication method according to any of Supplementary Note 1 or 2, comprising
    setting a region for each attribute of the other user within the map image, and associating the other user having the attribute with a predetermined position within the region for the attribute.

(Supplementary Note 4)
  The communication method according to any of Supplementary Notes 1 to 3, comprising:
    without displaying information identifying the other user on the map image, outputting the map image so as to display to the target user; and
    when the position on the map image where the other user is associated is selected by the target user, outputting the information identifying the other user so as to display on the map image.

(Supplementary Note 5)
The communication method according to any of Supplementary Notes 1 to 4, comprising
when the position on the map image where the other user is associated is selected by the target user and furthermore a communication request to the other user is accepted from the target user, notifying the acceptance of the communication request to the other user from the target user.

(Supplementary Note 6)
The communication method according to any of Supplementary Notes 1 to 5, comprising
acquiring information sent by the target user, and outputting to the other user associated with the position on the map image selected by the target user.

(Supplementary Note 6.1)
The communication method according to Supplementary Note 5, comprising
upon accepting the communication request to the other user from the target user, acquiring information sent by the target user, and outputting to the other user.

(Supplementary Note 7)
The communication method according to Supplementary Note 6 or 6.1, comprising
acquiring the information sent by the other user and the information sent by the target user, and outputting to still another user associated with another position having a preset relation with the position where the other user is associated selected by the target user.

(Supplementary Note 8)
The communication method according to any of Supplementary Notes 1 to 7, comprising
acquiring the information sent by the other user and, based on the acquired information, displaying information representing information transmission at the position on the map image where the other user is associated.

(Supplementary Note 8.1)
The communication method according to any of Supplementary Notes 1 to 8, comprising
acquiring, as the information sent by the other user, one or both of voice information uttered by the other user and text information input by the other user, and outputting to the target user.

(Supplementary Note 9)
A communication apparatus comprising:
a map display unit configured to output a map image on which another user is associated with a predetermined position so as to display to a target user;
a selection accepting unit configured to accept selection of a position by the target user on the map image; and
an output unit configured to acquire information sent by the other user associated with the position on the map image selected by the target user, and output to the target user.

(Supplementary Note 9.1)
The communication apparatus according to Supplementary Note 9, wherein:
the selection accepting unit is configured to accept a position of an icon movably displayed on the map image as the position selected by the target user; and
the output unit is configured to acquire information sent by the other user associated with the position of the icon, and output to the target user.

(Supplementary Note 9.2)
The communication apparatus according to Supplementary Note 9.1, wherein
the selection accepting unit is configured to automatically move the position of the icon on the map image with a preset behavior, and accept the moved position of the icon as the position selected by the target user.

(Supplementary Note 9.3)
The communication apparatus according to any of Supplementary Notes 9 to 9.2, wherein
the map display unit is configured to, without displaying information identifying the other user on the map image, output the map image so as to display to the target user.

(Supplementary Note 9.4)
The communication apparatus according to any of Supplementary Notes 9 to 9.3, wherein
the map display unit is configured to set a region for each attribute of the other user within the map image, and associate the other user having the attribute with a predetermined position within the region for the attribute.

(Supplementary Note 9.5)
The communication apparatus according to any of Supplementary Notes 9 to 9.4, wherein:
the map display unit is configured to, without displaying information identifying the other user on the map image, output the map image so as to display to the target user; and
the output unit is configured to, when the position on the map image where the other user is associated is selected by the target user, output the information identifying the other user so as to display on the map image.

(Supplementary Note 9.6)
The communication apparatus according to any of Supplementary Notes 9 to 9.5, wherein
the output unit is configured to, when the position on the map image where the other user is associated is selected by the target user and furthermore a communication request to the other user is accepted from the target user, notify the acceptance of the communication request to the other user from the target user.

(Supplementary Note 9.7)
The communication apparatus according to any of Supplementary Notes 9 to 9.6, wherein
the output unit is configured to acquire information sent by the target user, and output to the other user associated with the position on the map image selected by the target user.

(Supplementary Note 9.8)
The communication apparatus according to Supplementary Note 9.6, wherein
the output unit is configured to, upon accepting the communication request to the other user from the target user, acquire information sent by the target user, and output to the other user.

(Supplementary Note 9.9)
The communication apparatus according to Supplementary Note 9.7 or 9.8, wherein
the output unit is configured to acquire the information sent by the other user and the information sent by the target user, and output to still another user associated with another position having a preset relation with the position where the other user is associated selected by the target user.

(Supplementary Note 9.10)
The communication apparatus according to any of Supplementary Notes 9 to 9.9, wherein the output unit is configured to acquire the information sent by the other user and, based on the acquired information, display information representing information transmission at the position on the map image where the other user is associated.

(Supplementary Note 10)

A computer program comprising instructions for causing an information processing apparatus to execute processes to:
output a map image on which another user is associated with a predetermined position so as to display to a target user;
accept selection of a position by the target user on the map image; and
acquire information sent by the other user associated with the position on the map image selected by the target user, and output to the target user.

(Supplementary Note 11)

A communication system comprising a target user terminal operated by a target user, another user terminal operated by another user, and a server apparatus connected to the target user terminal and the other user terminal via a network, wherein the server apparatus includes:
a map display unit configured to output a map image on which another user is associated with a predetermined position so as to display to a target user;
a selection accepting unit configured to accept selection of a position by the target user on the map image; and
an output unit configured to acquire information sent by the other user associated with the position on the map image selected by the target user, and output to the target user.

The present invention is based upon and claims the benefit of priority from Japanese patent application No. 2021-022097, filed on Feb. 15, 2021, the disclosure of which is incorporated herein in its entirety by reference.

REFERENCE SIGNS LIST 10 server apparatus
11 map display unit
12 selection accepting unit
13 information acquiring unit
14 output unit
16 map information storing unit
M map image
U target user
U1, U2 other users
T, T1, T2 user terminal
100 communication apparatus
101 CPU
102 ROM
103 RAM
104 programs
105 storage device
106 drive device
107 communication interface
108 input/output interface
109 bus
110 storage medium
111 communication network
121 map display unit
122 selection accepting unit
123 output unit

What is claimed is:

1. A communication method comprising:
outputting a map image on which another user is associated with a predetermined position so as to display to a target user;
accepting selection of a position by the target user on the map image, accepting a position of an icon movably displayed on the map image as the position selected by the target user, automatically moving the position of the icon of the target user on the map image with a preset behavior, and accepting the moved position of the icon as the position selected by the target user;
acquiring information sent by the other user associated with the position on the map image selected by the target user, and outputting to the target user;
setting a region for each attribute of the other user within the map image, and associating the other user having the attribute with a predetermined position within the region for the attribute, and
automatically moving the position of the icon so as to cruise in the region for each attribute of the other user within the map image, and accepting the moved position of the icon as the position selected by the target user.

2. The communication method according to claim 1, comprising:
without displaying information identifying the other user on the map image, outputting the map image so as to display to the target user; and
when the position on the map image where the other user is associated is selected by the target user, outputting the information identifying the other user so as to display on the map image.

3. The communication method according to claim 1, comprising
when the position on the map image where the other user is associated is selected by the target user and furthermore a communication request to the other user is accepted from the target user, notifying the acceptance of the communication request to the other user from the target user.

4. The communication method according to claim 3, comprising
upon accepting the communication request to the other user from the target user, acquiring information sent by the target user, and outputting to the other user.

5. The communication method according to claim 1, comprising
acquiring information sent by the target user, and outputting to the other user associated with the position on the map image selected by the target user.

6. The communication method according to claim 5, comprising
acquiring the information sent by the other user and the information sent by the target user, and outputting to still another user associated with another position having a preset relation with the position where the other user is associated selected by the target user.

7. The communication method according to claim 1, comprising
acquiring the information sent by the other user and, based on the acquired information, displaying information representing information transmission at the position on the map image where the other user is associated.

8. The communication method according to claim 1, comprising
acquiring, as the information sent by the other user, one or both of voice information uttered by the other user and text information input by the other user, and outputting to the target user.

9. The communication method according to claim 1, further comprising
setting, within the map image, a region of the target user at a center, and the region for each attribute of the other user annularly around the center.

10. The communication method according to claim 9, wherein
the setting of the region for each attribute of the other user annularly within the map image is setting such that the region farther from the center is a region for an attribute having a lesser relation to an attribute of the target user.

11. The communication method according to claim 9, further comprising automatically moving the position of the icon so as to go around along the annular shape within the region for each attribute of the other user.

12. A communication apparatus comprising:
at least one memory configured to store instructions; and
at least one processor configured to execute the instructions to:
output a map image on which another user is associated with a predetermined position so as to display to a target user;
accept selection of a position by the target user on the map image, accept a position of an icon movably displayed on the map image as the position selected by the target user, automatically move the position of the icon of the target user on the map image with a preset behavior, and accept the moved position of the icon as the position selected by the target user;
acquire information sent by the other user associated with the position on the map image selected by the target user, and output to the target user;
set a region for each attribute of the other user within the map image, and associate the other user having the attribute with a predetermined position within the region for the attribute, and
automatically move the position of the icon so as to cruise in the region for each attribute of the other user within the map image, and accept the moved position of the icon as the position selected by the target user.

13. The communication apparatus according to claim 12, wherein the at least one processor is configured to execute the instructions to
acquire information sent by the target user, and output to the other user associated with the position on the map image selected by the target user.

14. The communication apparatus according to claim 13, wherein the at least one processor is configured to execute the instructions to
acquire the information sent by the other user and the information sent by the target user, and output to still another user associated with another position having a preset relation with the position where the other user is associated selected by the target user.

15. A non-transitory computer-readable storage medium storing a program comprising instructions for causing an information processing apparatus to execute processes to:
output a map image on which another user is associated with a predetermined position so as to display to a target user;
accept selection of a position by the target user on the map image, accept a position of an icon movably displayed on the map image as the position selected by the target user, automatically move the position of the icon of the target user on the map image with a preset behavior, and accept the moved position of the icon as the position selected by the target user;
acquire information sent by the other user associated with the position on the map image selected by the target user, and output to the target user;
set a region for each attribute of the other user within the map image, and associate the other user having the attribute with a predetermined position within the region for the attribute, and
automatically move the position of the icon so as to cruise in the region for each attribute of the other user within the map image, and accept the moved position of the icon as the position selected by the target user.

* * * * *